United States Patent [19]

Story

[11] 3,711,862

[45] Jan. 16, 1973

[54] MARINE TRANSPORTATION ANALYSIS COMPUTATION

[76] Inventor: Eugene Story, Reeder Lane, New Canaan, Conn. 06840

[22] Filed: April 9, 1971

[21] Appl. No.: 132,811

[52] U.S. Cl. ....................................................444/1

[51] Int. Cl. .....G06f 15/06, G06f 15/24, G06f 15/48

[58] Field of Search..........................................444/1

[56] References Cited

OTHER PUBLICATIONS

Scheduling a Vehicle Between an Origin and a Destination to Maximize Traveller Satisfaction, Proceedings of 22ND National Conference of the Association for Computing Machinery, 1967, Young, Dennis, pp. 233–245 L7140 0155 147.

Locomotive Scheduling by Computer, 1966 British Joint Computer Conference, Wolfenden, K., Wren, A., pp. 31–37 L7140 1086 1076.

A Computer Application to a Transport Scheduling Problem, The Computer Journal, Vol. 10, Issue 1, May 67, Pullen, H. G. M., Webb, M. H. J., pp. 10–13 L7140 1465 1473.

*Primary Examiner*—Malcolm A. Morrison
*Assistant Examiner*—Edward J. Wise
*Attorney*—Stephen B. Judlowe and Sandoe, Hopgood & Calimafde

[57] ABSTRACT

Digital computing apparatus employs peripheral memory equipment for storing plural record ship and voyage files. Each ship file record contains all requisite parameters, stored in a fixed format, to characterize the performance, capabilities and limitations of a corresponding vessel. Correspondingly, each voyage file record independently stores economic and physical parameters characterizing a set of commercial cargo trades (herein: "voyages") for the ship ensemble. The voyages may comprise ballast, loaded or combined ballast and loaded voyage legs.

Under operator control, the records for a selected ship and voyage are called into predetermined main frame memory storage locations. The mathematical ship model is then given the maximum possible loading subject to ship, voyage and/or hybrid constraints encountered for the entire course of the voyage under stored program control. Appropriate economic performance data is generated, and normalized to facilitate performance comparison.

In accordance with one aspect of my invention, a matrix data presentation is generated for computer testing of a set of ships on each of a set of voyages, as for comparison and scheduling purposes.

18 Claims, 9 Drawing Figures

MARINE TRANSPORTATION ANALYSIS COMPUTATION

DISCLOSURE OF THE INVENTION

Figure 1:
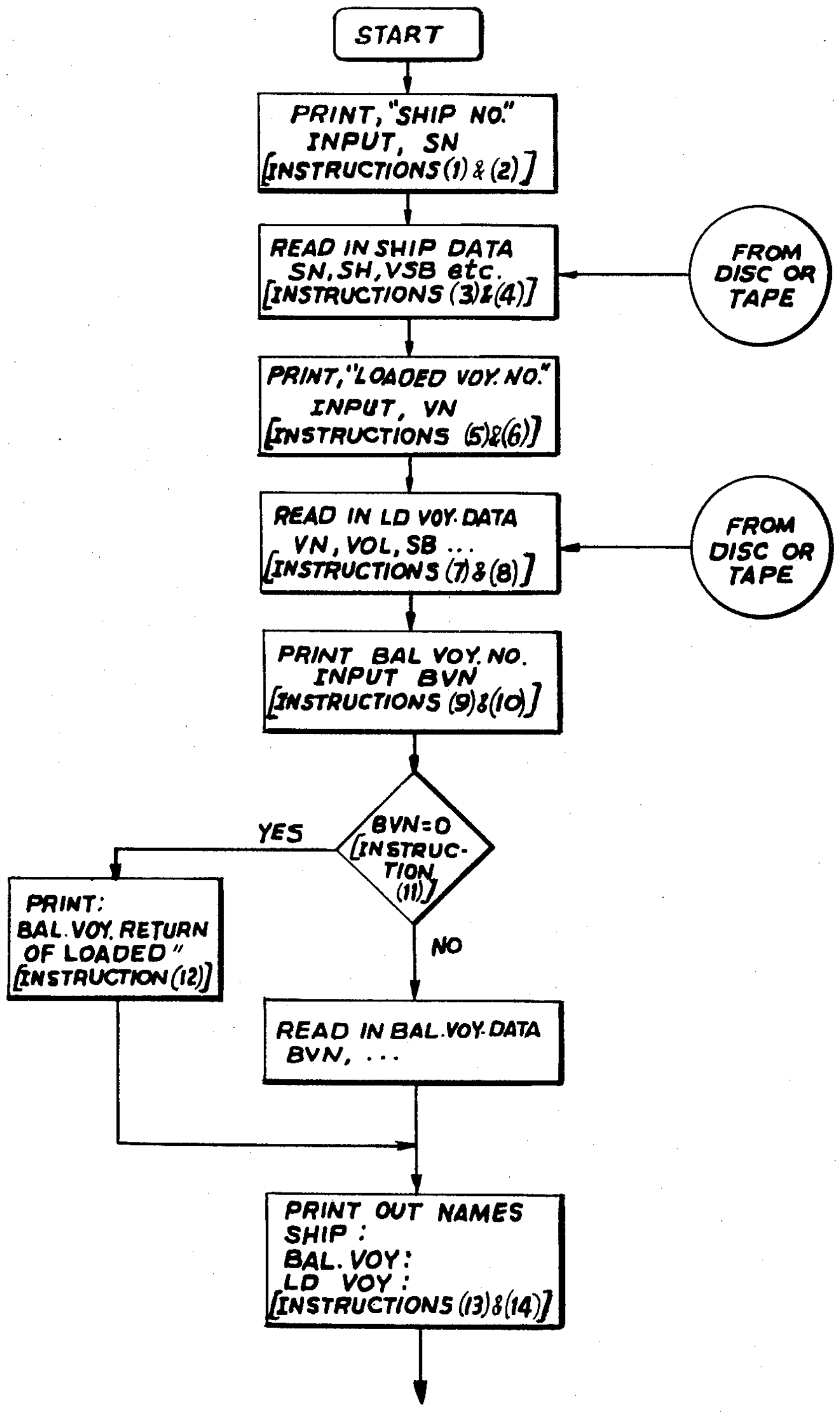
Figure 2:
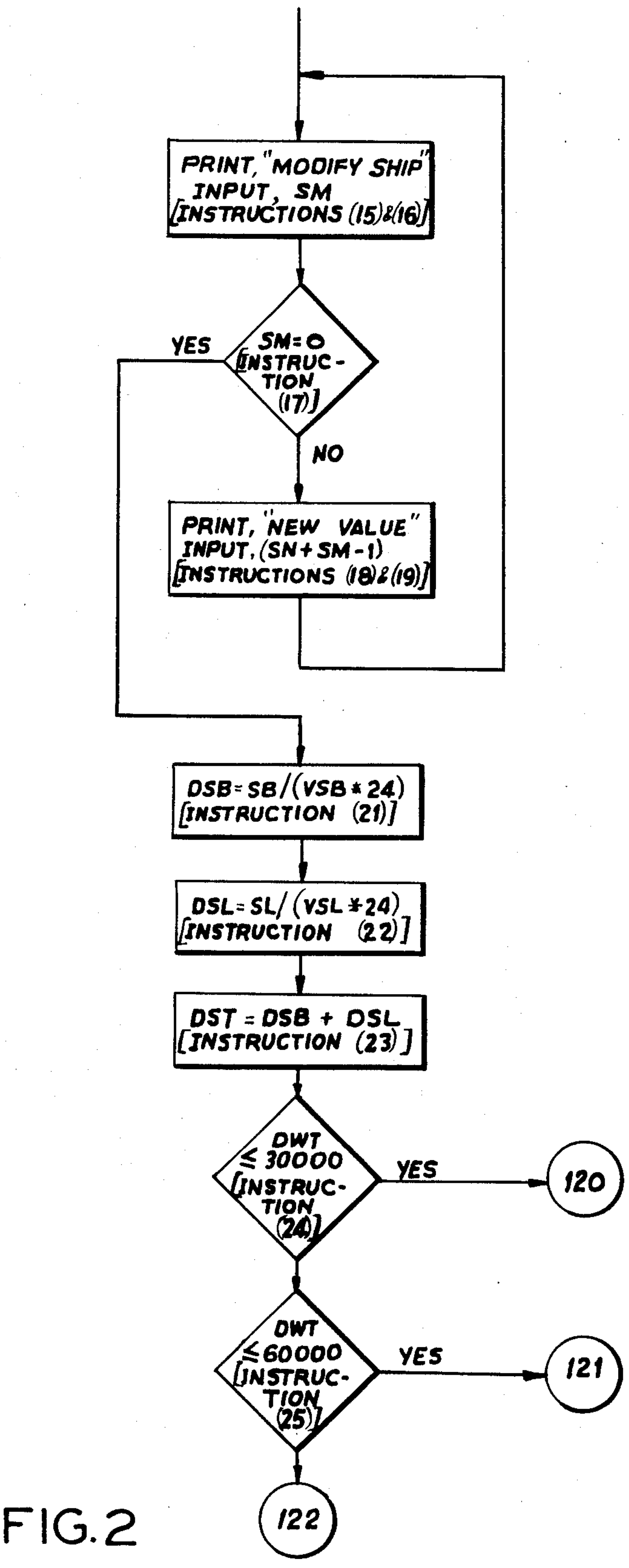
Figure 3:
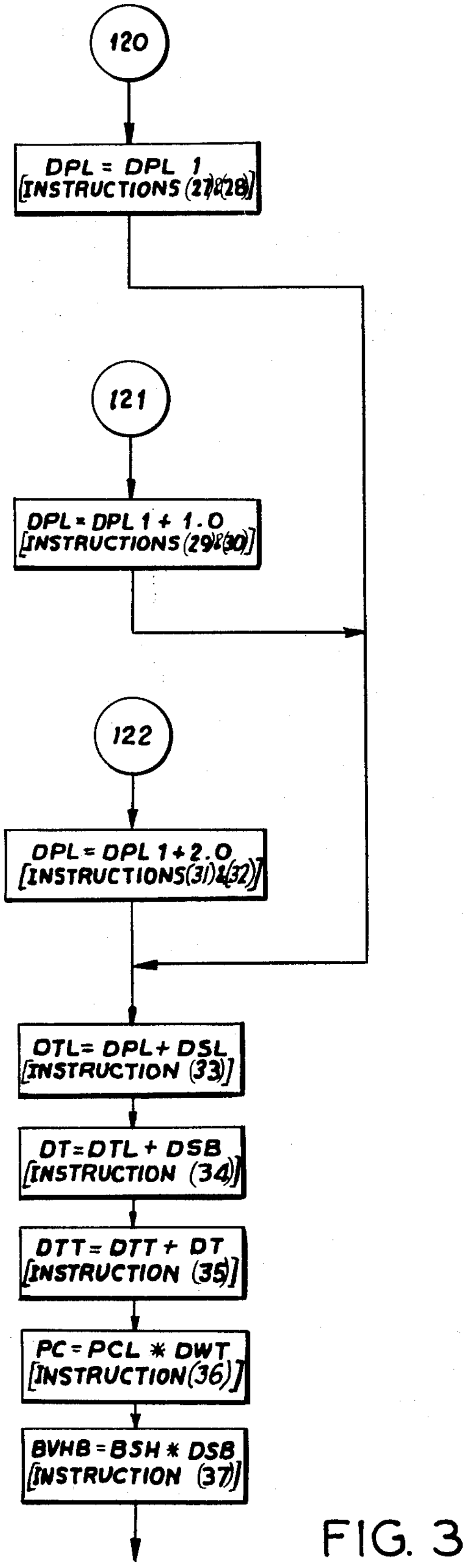
Figure 4:
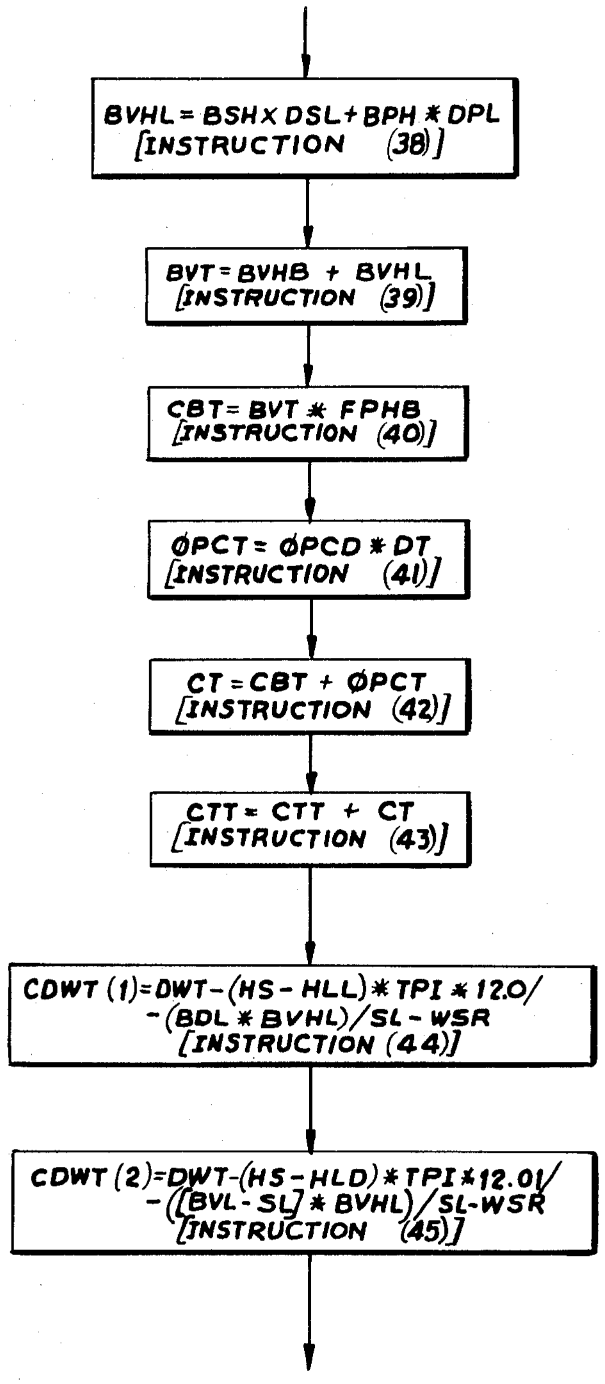
Figure 5:
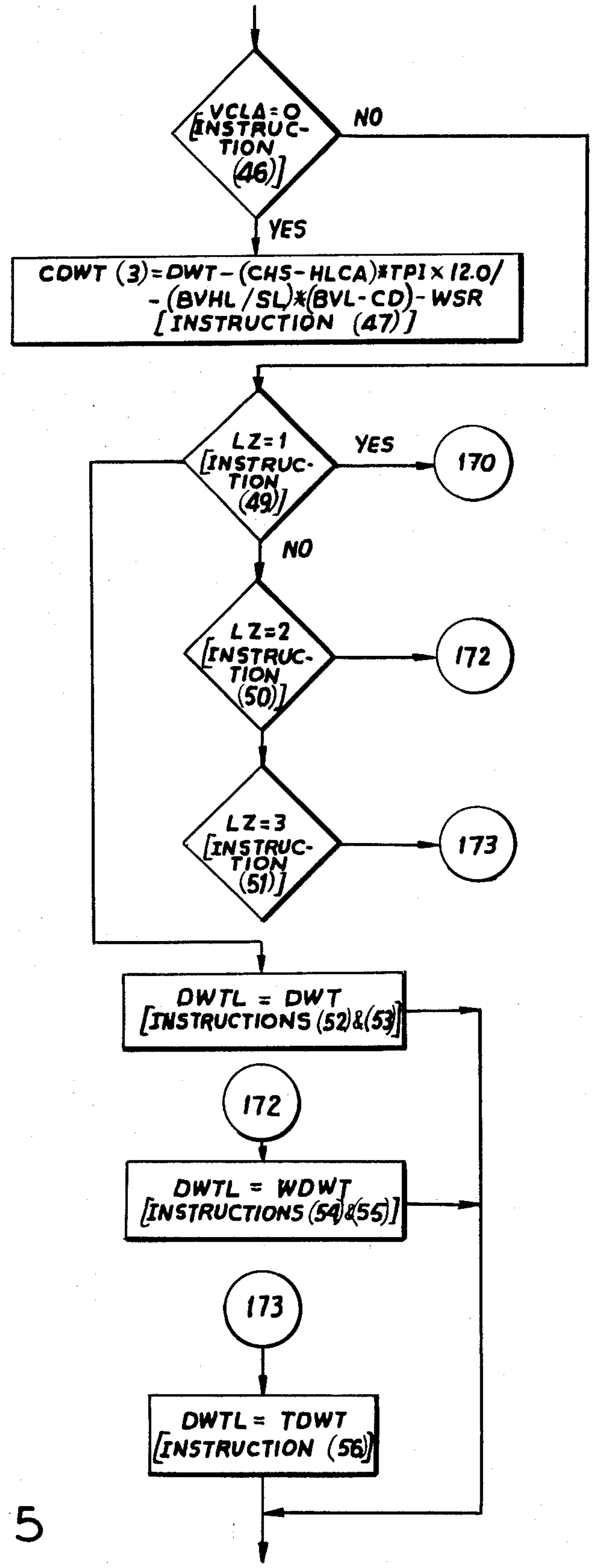
Figure 6:
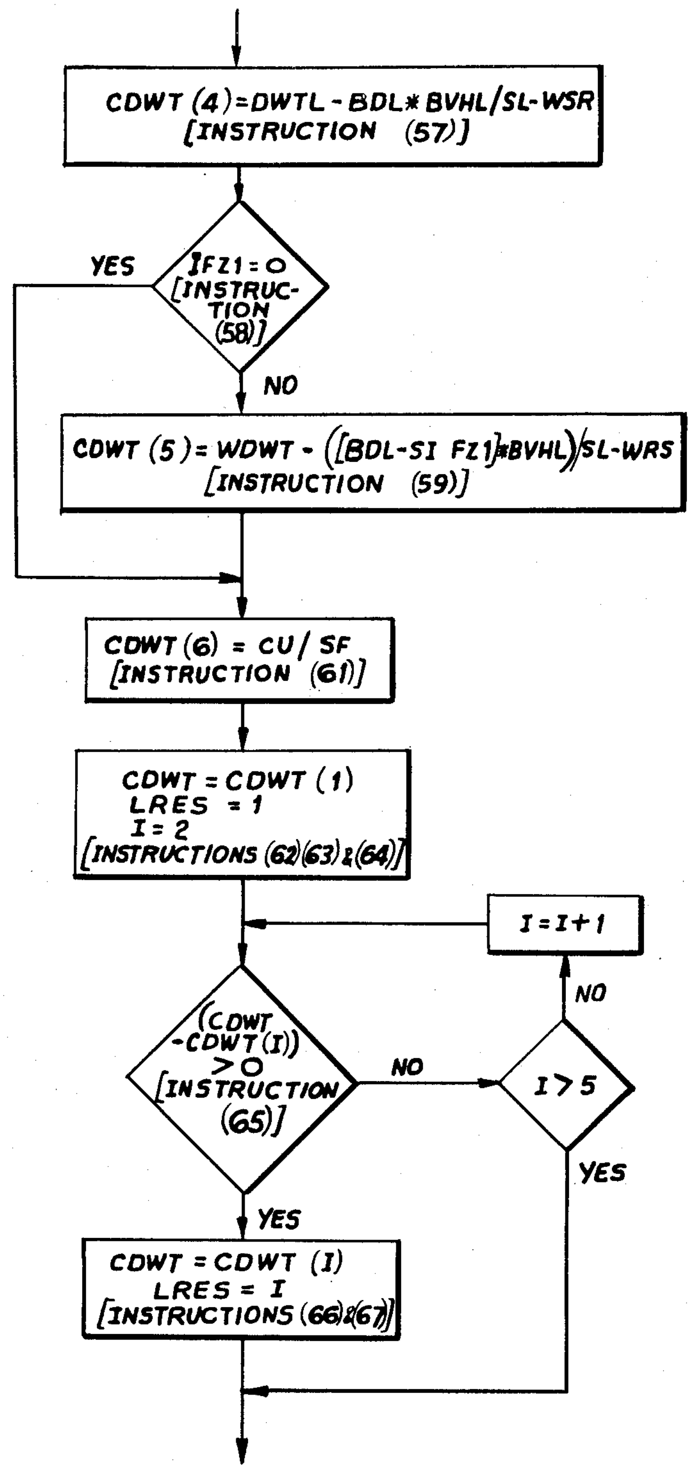
Figure 7:
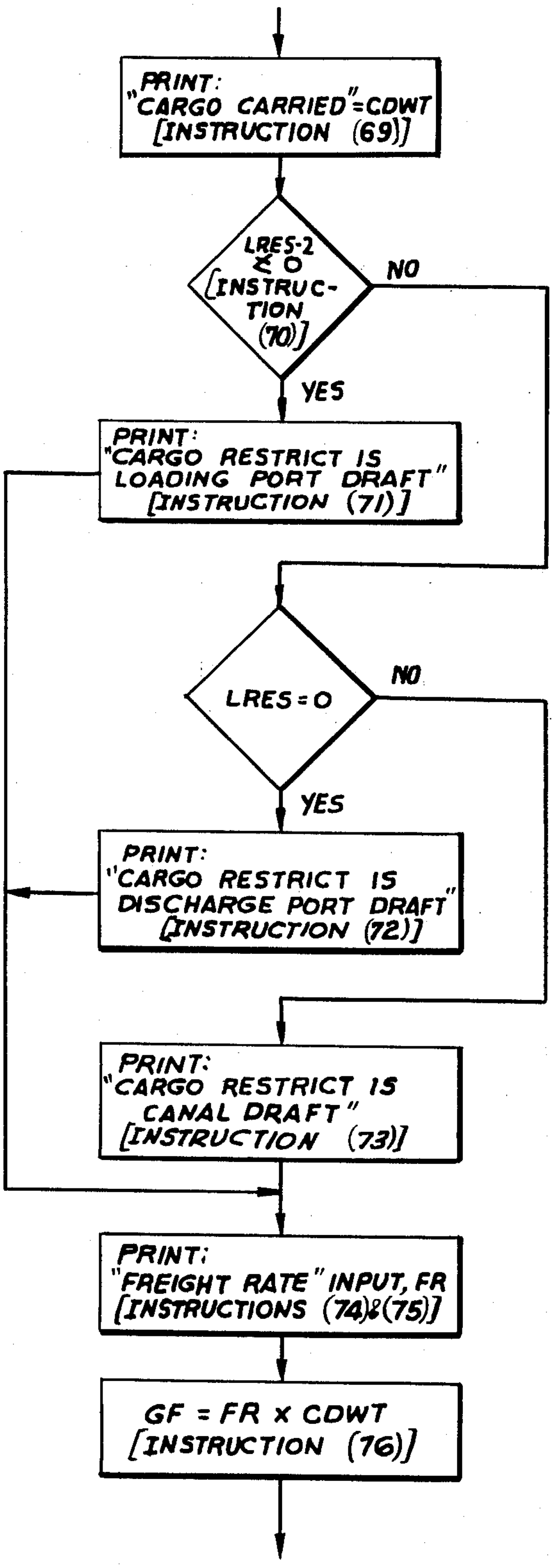
Figure 8:
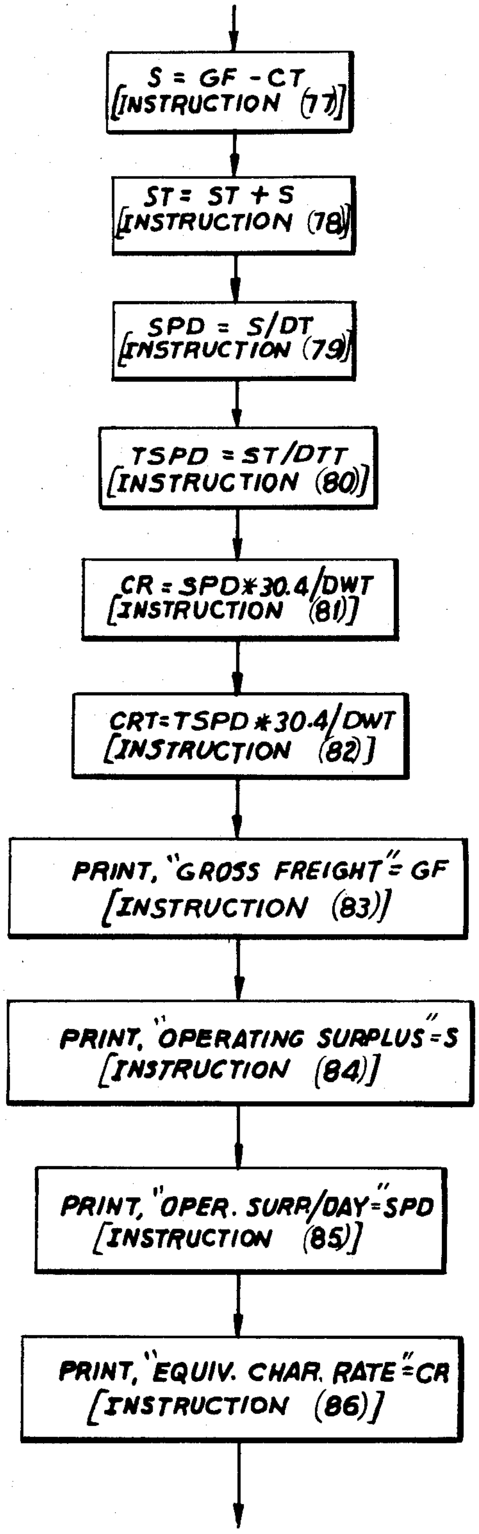
Figure 9:
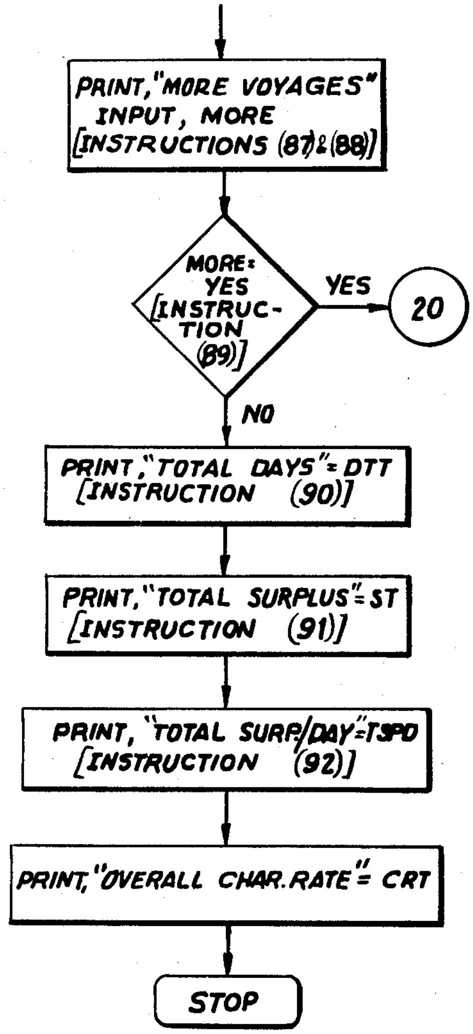

This invention relates to computer programing and, more specifically, to a program for evaluating the economic performance of a ship or set (fleet) of ships on a possible voyage (as this latter term is defined herein), or set of voyages.

The beneficial owner of a ship or ship fleet advantageously applies his ships to commercial trades (a combination cargo and voyage route) in a manner which will yield optimum, or at least highly satisfactory profits commensurate with existing contractual limitations, if any. The owner, charterer, or the like typically operates his vessel(s) under a set of constraints which limit free choice of trade. Thus, for example, one major class of fleet owners and charter holders of large capacity vessels, viz., the international oil companies, are obliged to fulfill certain quota commitments both as to oil source ports and refinery delivery ports. The excess carriage capacity of these fleets must then be applied to convey oil and/or dry cargo if appropriate in an economically satisfactory manner.

A typical voyage for an oil tanker may include a loaded leg from an oil source port to a delivery area, and a ballast (load-free) leg either returning to the original source port or to some other cargo source station. In selecting a ship's itinerary, the total costs of a voyage including the actual monetary costs and the time expenditure for any ballast leg must be considered.

Existing tanker (and other) vessels are characterized by a great disparity in cargo capacity, operating characteristics, voyage capabilities and the like. For example, tankers vary from a few thousand tons dead weight displacement to modern supertankers exceeding three hundred thousand tons, and significantly larger vessels are currently contemplated. The operative economics for these diverse ships are obviously markedly different.

Correspondingly also, the spectrum of trade routes varies markedly. Thus, for example, some voyage paths include canal, draft or port restrictions which may affect a ship's passage or, in fact, exclude a particular vessel from undertaking a voyage.

Accordingly, with the plethora of apparently interrelated considerations, the comparison of possible routes for a ship or fleet, as for scheduling purposes, has largely proceeded on an empirical, "seat of the pants" basis. Personnel in the operating department of an owner entity typically make several calculations for the performance of a ship or ships for several trades which seem "desirable" by some uncertain standard for that ship. Once done, it is difficult to compare the results of these calculations, which may differ as to cargo, duration and the like. In any event, some selection was then made which hopefully was at least a tolerable application of available resources.

The advent of available digital computer capacity helped somewhat. The operations personnel now programed these calculations. By supplying the economic data characterizing the dependent performance function of a given ship on a given voyage (by input data cards or the like for each such computation) the same kind of output information was obtained by the same calculation, the computing machine thus replacing the need for manual arithmetic manipulation. The calculations could then be repeated as desired by furnishing new input data characterizing the ship on a different voyage, or vice-versa.

This process, while certainly very helpful in automating the theretofore mechanical effort, requires full, new data entries for every trial and, moreover, furnishes output data which is not readily subject to meaningful comparison.

It is thus an object of the present invention to provide an improved computational mode for analyzing the economic performance of ship operation.

More specifically, an object of the present invention is the provision of computing apparatus, suitably programed, for effecting marine economic commutations in an efficient and flexible manner to yield meaningful output information.

The above and other objects of the present invention are realized in a specific, illustrative computing arrangement wherein a peripheral computer storage medium, e.g., a tape store includes therein a ship file and a voyage file. The ship file comprises a record for each subject ship, each record including, in a fixed, like format, all operational, physical and financial information to characterize the corresponding vessel. Correspondingly, the voyage file comprises a plurality of records for each possible voyage (different trades over the same route being defined as different "voyages"), each such record including, in prescribed format order, all requisite information characterizing that voyage.

To determine the performance of any ship on any voyage, the ship and voyage (loaded and ballast leg) identities are signaled to the computer under operator control, as by a teletype unit. The pertinent ship and voyage data is then selected from the tape unit and loaded into the main frame compute memory, e.g., into core storage.

The program then proceeds to mathematically load the ship, employing all constraints imposed by the ship, the voyage and/or their combination. Moreover, these constraints are examined at all critical points for the voyage to assure that no loading bound will be exceeded. The economic posture of the voyage is then determined, and is normalized to a fixed reference (an equivalent time charter rate) for ready comparison purposes.

In accordance with one aspect of my invention, a matrix data presentation is developed for a set of ships each tested for each of a set of voyages, as for ship scheduling purposes.

The above and other features, objects and advantages of the present invention are realized in a specific, illustrative embodiment thereof which will now be described in detail in conformance with the accompanying drawing which is a flow chart depicting the computer processing set forth hereinbelow.

A computational arrangement for determining the economic performance of commercial shipping vessels applied to varying trades employs a digital computer having stored therein a program described hereinbelow. The composite computing apparatus includes two files for respectively storing the characteristics of an arbitrarily large number of ships, and for storing the parameters of an arbitrarily large set of voyages, all as more fully discussed below. The files may be stored directly in the main frame memory, e.g., "in core," assuming this memory has sufficient capacity to store all requisite data, program instructions, the computer executive program, computational space and the like. More typically, the ship and voyage files are included in an on-line peripheral store, e.g., one or more tape, disc, or drum units, or the like. The computing arrangement also includes input/output equipment, such as a teletypewriter, which may print messages from the computer to a system operator, and enter selected data from the operator into the computer.

As one basic aspect of my invention, the computing apparatus determines the economic performance of a ship on a particular "voyage" and, at the user's option, over a consecutive series of voyages. A voyage may comprise, for example, a round trip of a tanker from a Persian Gulf port e.g., Ras Tanura) to a European crude oil processing port such as Rotterdam, i.e., a loaded voyage leg and also a return, ballast leg. Other voyages may comprise a simple loaded leg between two ports where a vessel may unload one cargo at the discharge port and take on a second cargo to undertake a following voyage. The voyage file is made sufficiently complete such that the system operator may inquire regarding the performance of a ship for any contemplated route and cargo, each different voyage being identified by a different voyage number. Thus, for example, voyages between the same ports, but under different loading conditions, e.g., loaded with crude, varying cargo mixes for a combination ship, or ballast are entered into the voyage file as separate voyage records.

The ship file includes a number of records in one-to-one correspondence with the number of ships. Each record is of a like format containing a plurality of storage locations for storing a particular ship's parameter therein. Thus, for example, the ship file may be constructed as follows:

TABLE I

Illustrative Ship File Record

| Relative storage address with reference to the first record storage cell | Parameter | Variable symbol as used below |
|---|---|---|
| 1. | Ship number. | SN |
| 2. | Ship name (alphanumeric characters). | SH |
| 3. | Ship's speed at ballast (knots/hr). | VSB |
| 4. | Loaded speed (knots/hr). | VSL |
| 5. | Dead weight tonnage (summer draft). | DWT |
| 6. | Dead weight tonnage (winter draft). | WDWT |
| 7. | Dead weight tonnage (tropical draft). | TDWT |
| 8. | Bunkers per day consumed at sea (tons per day). | BSH |
| 9. | Diesel oil consumed at sea (tons per day). | not used |
| 10. | Bunkers per day consumed in port. | BPH |
| 11. | Diesel per day consumed in port. | not used |
| 12. | Draft at full dead weight (summer zOne). | HS |
| 13. | Draft gradient about full dead weight (tons per inch). | TPI |
| 14. | Weight of provisions and reserves. | WSR |
| 15. | Cubic feet of cargo volume | CU |
| 16. | Daily operating expenses including financial charges. | OPCD |

The above information, stored in the same order for each vessel, is sufficient to completely characterize the vessel for all anticipated operating conditions. Moreover, and of critical importance for the present invention, the above parameters are isolated and stored in a manner to be independent of any particular voyage. Similarly, as more fully discussed below, parameters for each voyage are isolated and stored in a voyage file record independent of the particular vessel practicing under that voyage. Thus, the economics for any ship on any voyage may be determined by identifying a ship and a voyage to the program stored in the computer, the program being adapted to apply the ship operatively characterized in the record therefor to the selected voyage having its description parameters stored in the selected voyage file.

Further, the overall performance of a ship on a consecutive series of voyages may be determined, with cumulative economic data being developed as well as descriptive information for each of the several voyage legs. Moreover, to provide a fixed record for the performance of a ship on several voyages or several ships on a particular voyage, the profitability determination is normalized to an equivalent time charter rate such that the computational results may be readily and meaningfully compared.

The record format for each voyage in the voyage file may be as follows:

TABLE II

Illustrative Voyage File Record

| Relative storage address with reference to the first record storage cell | Parameter | Variable symbol as used below |
|---|---|---|
| 1. | Voyage number | VN |
| 2. | Voyage name (alphanumeric characters) | VOL |
| 3. | Ballast distance (nautical miles). | SB |
| 4. | Loaded distance (nautical miles). | SL |
| 5. | Port days required to load a ship of 30,000 tons or less with existing loading port facilities. | DPL1 |
| 6. | Port charge per dead weight ton. | PCL |
| 7. | Cost of bunkers per ton. | FPHB |
| 8. | Cost of diesel fuel per ton. | not used |
| 9. | Maximum draft at loading port. | HLL |
| 10. | Maximum draft at discharge port. | HLD |
| 11. | Bunker distance from loading port to refueling station. | BDL |
| 12. | Freeboard zone of loading port (characters 1, 2, and 3 identify a summer, winter or tropical zone, respectively). | LZ |
| 13. | Canal identifier (a stored "1" or "0" respectively signal that the voyage requires the ship to pass through a particular canal). | VCLA |
| 14. | Distance from the loading port to the canal of relative address 13. | CD |
| 15. | Maximum permitted draft at the canal of relative address 13. | HLCA |
| 16. | Lesser freeboard zone identifier (a "1" or "0" respectively signals that the voyage includes passage from a higher to a lesser freeboard zone, e.g., from a summer to a winter zone). | IFZ1 |
| 17. | Distance from loading port to the lesser freeboard zone (nautical miles). | SIFZ1 |
| 18. | Cargo density for the particular trade of voyage SN (cubic feet per ton) | SF |

The computation effected by the digital computer to perform a voyage analysis, and the stored program for effecting such computation will now be considered. In the description herein of a detailed embodiment of the present invention, the stored program will be presented in FORTRAN compiler language, schematic statements thereof being employed for purposes of description as helpful and illustrative. It is observed, however, that applicant's invention may be practiced in other programing languages, including other compiler, assembly or direct machine languages. In FORTRAN notation, the operators "+," "–," "*" and "/" signal addition, subtraction, multiplication and division, respectively.

As a first system function, the computer asks an operator at the input/output device, e.g., a teletypewriter console, to identify the ship which is to be applied to a voyage. Upon receiving this information, the record of the selected ship, including all required stored parameters therefor, are entered into the indicated variable storage locations in the main frame memory. An illustrative sequence of instructions for effecting this operation is:

```
PRINT, "SHIP NUMBER:"                         1
INPUT, SN                                     2
set file pointer F1 to beginning of /
SN record                                     3
READ (F1) SN, SH, VSB, VSL, DWT,
  WDWT, /
TDWT, BSH, BPH, HS, TPI, WSR, /
CU, OPCD                                      4
```

The PRINT instruction (1) causes the teletypewriter to print the literal argument of the instruction, within the quotation marks, i.e., the alphanumeric characters —SHIP NUMBER:—. The operator attending the console receiving this message, types in the number of the ship, e.g., a plural digit number 100247 to identify a particular vessel, for example a 252,000 dead weight ton tanker SEASTAR. After striking six digits, the operator engages the carriage return key which enters the number into a storage location SN (ship number — see Table 1, supra) under control of instruction (2). All data for the ship 100247 is then placed in the storage locations of Table I, a mode of functioning which depends in a manner well known to those skilled in the art upon the particular peripheral storage device containing the ship file, or from core directly if the information is there stored. Accordingly, in an appropriate manner, the entire file record (e.g., identified by a file pointer F1 which is loaded to identify the ship number SN) is read into the locations, SN, SH, . . . CU such that these storage addresses contain the operational parameters for the tanker SEASTAR. This is effected by the schematically illustrated statement (3) and the statement (4) which corresponds, for example, to read ship record data stored in a tape unit.

The next following instructions:

```
20 PRINT, "LOAD VOYAGE NO:"                   5
INPUT, VN                                     6
set file pointer F2 to beginning of
VN voyage record                              7
READ (F2) VN, VOL, SB, SL, DPL1, PCL,
FPHB, HLL, HLD, BDL, LZ,
VCLA, CD, HLCA, IFZ1, SIFZ1,
SF                                            8
```

operate in a manner similar to the instructions (1) – (4) to request a load voyage number (instruction [5] identified by the statement label 20 for purposes discussed below), and to read all of the parameters from the voyage file into the appropriate storage locations VN, VOL, . . . SF, e.g., for a round trip between Ras Tanura and Rotterdam. This voyage comprises a loaded leg (crude oil) from the Persian Gulf to Europe, and a ballast leg return trip.

The following instructions

```
PRINT, "BAL. VOY NO:"                          (9)
INPUT, BVN                                     (10)
IF (BVN), —, 40, —                             (11)
40 PRINT, "BAL. VOY: RETURN OF LD VOY"         (12)
41 PRINT, "SHIP:", SH                          (13)
PRINT, "LD. VOY:", VOL                         (14)
```

first cause the teletypewriter to ask the operator to identify a ballast voyage. Since the particular voyage in question already contains a ballast leg, the console operator enters a zero into the ballast voyage number storage cell BVN (instruction [10]).

The IF statement of instruction (11) is of the general form

IF (A–B), 100, 200, 300 and causes the program sequence to transfer to an instruction labeled 100 if the argument of the IF statement, in this case the expression "A–B," is negative; to transfer to an instruction labeled 200 if the argument is "0;"and to transfer to an instruction with a label 300 if the argument is positive. Accordingly, for program instruction (11) where for the assumed case BVN is zero, the IF statement causes the instruction location counter of the computer to transfer to instruction (12) labeled 40 which is to be next executed. It is observed that the instruction (12) as a general matter will not immediately follow the IF statement of instruction (11) in the order of execution. Non-zero values for BVN may well in other instances identify a ballast leg distinct from the return of the loaded leg and thus initiate an additional mode of computational operation to separately compute data of the type considered below for the ballast leg distinct from that determined for the loaded leg.

However, for the assumed situation where the voyage VN includes both loaded and ballast legs, control is transferred to the instruction labeled 40. Instructions (12) – (14) then print out three lines at the teletypewriter, instruction (12) preserving a record for the operator to identify the ballast leg as being the return of the loaded voyage leg. Instruction (13) will then cause a print out SHIP: SEASTAR, the matter within quotation marks in the instruction, viz., —SHIP:—, being literally printed and the specific ship name SEASTAR stored in the location SH being printed to complete the record. In a similar manner, instruction (14) causes a print out LD. VOY: RAS TANURA/ROTTERDAM.

As the next matter of data processing, the following instructions are employed to permit the operator to modify any ship parameter from the norms stated therefor in the ship file loaded into the main frame memory address. These statements (15) – (20) are for modification of the ship data, and it is observed that like statements may be employed to modify the voyage parameters. Thus, for example, an operator must reduce the ship's speed value at times approaching the dry dock period when actual ship's speed may be reduced by reason of a dirty bottom or loss of propeller efficiency. Illustratively also, voyage parameters may have to be modified, as during repair periods for port pumps, interruption of a canal passage, or the like. Such a modification routine comprises:

```
99 PRINT, "MODIFY SHIP OR 0:"     (15)
INPUT, SM                          (16)
IF (SM) 100, 110, 100              (17)
100 PRINT, "NEW VAL:"              (18)
INPUT, SN + SM - 1                 (19)
110 CONTINUE                       (20)
```

Instruction (15) asks the user to type a "0" on his teletypewriter if no modifications are desired, or to identify a particular item (the left column of Table I) if a particular parameter is to be changed. The entry is loaded into a storage location SM which is tested by instruction (17). If SM is "0" (no change desired), control is transferred to a statement labeled 110 (instruction [20]) which is a non-executable CONTINUE statement. The computer then simply proceeds with data processing. Where *SM*=0, the IF statement (17) permits execution of statements (18) and (19) which first ask that the user type in the new value for the parameter to be changed, and then enter this new value in the appropriate storage location which is given by SN+SM−1. If desired, a statement such as GO TO 99 may be employed before the CONTINUE instruction to ask the employee if he has additional changes. Again, similar instructions may be employed to permit modification of the voyage data.

At this point, all necessary data to begin the voyage analysis has been entered into the computer, the program now being able to apply the ship to the voyage in accordance with the stored program. To this end, the period consumed by the ship in making the voyage is determined by:

```
DSB = SB/ (VSB*24)                      (21)
DSL = SL/ (VSL*24)                      (22)
DST = DSB+DSL                           (23)
IF (DWT.LE. 30000) GO TO 120            (24)
IF (DWT.LE. 60000) GO TO 121            (25)
IF (DWT.GE. 60001) GO TO 122            (26)
120 DPL = DPL1                          (27)
GO TO 123                               (28)
121 DPL = DPL1+1.0                      (29)
GO TO 123                               (30)
122 DPL = DPL1+2.0                      (31)
123 CONTINUE                            (32)
```

```
DTL = DPL+DSL                           (33)
DT = DTL+DSB                            (34)
DTT = DTT+DT                            (35)
```

The days consumed for the ballast (DSB) and loaded (DSL) legs of the voyage are calculated by instructions (21) and (22) which divide the ballast (SB) and loaded (SL) distances for the voyage by the speed of the ship at ballast (VSB) and under load (VSL). These periods are then added by instruction (23) to derive the total sea days DST.

The days in port required to load and discharge the cargo depend upon the size of the ship, it obviously requiring different periods to pump 10,000 tons of crude oil vis-a-vis 300,000 tons. Accordingly, instructions (24) - (26) test the dead weight (DWT) of the ship. One and only one of the instructions (24) - (26) can be satisfied by any ship dead weight. For the assumed vessel, the instruction (26) is executed since the argument of the conditional GO TO statement (26) is fulfilled, i.e., the number stored in the storage cell DWT (the ship dead weight of 252,000 tons) is greater than or equal to ("GE") 60001. The statement (26) thus transfers computer sequencing to an instruction labeled 122.

The instruction labeled 122 determines that the port days are equal to the minimum port days for small ship (DPL1 from the voyage file), with two additional days being required by reason of the 252,000 ton capacity of the SEASTAR. For ships smaller than 60,000 one of the statements (27) and (29) would be executed to load the port days storage address DPL with either the base value DPL1 or DPL1+1.

The total loaded days DTL, given by the sum of the port days and sea days, is calculated by instruction (33), and the total days DT consumed for the subject voyage is given by the sum of the loaded and ballast days (instruction [34]).

It is often desired to examine overall ship's performance for a number of voyages, which may or may not be identical. Accordingly, a cumulative total of the days consumed for all successive voyages DTT is determined by updating the former value thereof by the value DT for the current voyage (instruction [35]). It is assumed that all totalizing variables employed herein such as DTT are initially cleared, as by a simple statement *DTT* = 0, as a supervisory matter before execution of the substantive instructions herein presented.

The following instructions are employed to compute the costs associated with the intended voyage:

PC = PCL*DWT (36)

BVHB = BSH*DSB (37)

BVHL = BSH*DSL+BPH*DPL (38)

BVT = BVHB+BVHL (39)

CBT = BVT*FPHB (40)

OPCT = OPCD*DT (41)

CT = CBT+OPCT (42)

CTT = CTT+CT (43)

The port charge PC is determined by multiplying the port charge rate PCL from the voyage record times the dead weight of the ship from the ship record (instruction [36]). The tons of high viscosity crude oil fuel (bunkers) consumed on the ballast leg of the journey, BVHB is determined by multiplying the fuel consumption rate of the vessel at sea BSH by the ballast days at sea DSB (instruction [37]). Similarly, the bunkers consumed on the loaded leg is computed in instruction (38) by multiplying the sea and port fuel consumption rate BSH and BPH from the ship record by the computed days at sea and days at port DSL and DPL. The total bunkers consumed BVT is given by the sum of the ballast and loaded leg consumptions (instruction [39]), and the total costs of bunkers CBT is determined by multiplying the bunker consumption BVT by the fuel cost rate FBHB. A similar computation may be effected for diesel fuel consumptions.

The operating costs for the vessel OPCT, measured by stores consumed, interest on financial obligations, depreciation and the like for the voyage, is next calculated by multiplying the ship's costs per day OPCD by the total days consumed for the voyage DT (instruction [41]). Total voyage costs CT are calculated (instruction [42]) by adding the bunker costs and the daily operating charges OPCT. Instruction (43) updates the contents of a storage cell CTT which stores a running total of the charges accumulated over a series of voyages.

To determine the revenues to be derived by applying the ship to the subject voyage, the maximum amount of cargo which the vessel may transport must first be determined.

In this regard, it is noted that the ship can accept at the loading port only that cargo quantum which does not violate a loading restriction at any time during the journey. These restraints tend to be of two basic types, viz., draft or girth restrictions caused by physical limitations along the journey, and restraints by reason of the specific cargo. More specifically, the ship must be loaded so that it does not exceed the draft limitations at the loading port, at the discharge port, or of any intermediate point. Further to the above, it is noted that the maritime domain is divided into so called tropical, summer and winter freeboard zones. The maximum draft for the ship, prescribed by marine societies and thereby effectively made mandatory by insurance considerations, and therefore its permitted loading, differs for each of these zones, decreasing in the order listed above. Thus, when a ship passes from a higher service zone to a more severe zone, e.g., from tropical to summer, or from summer to winter, the draft of the ship as it enters the more severe zone must not exceed the bound therefor.

The cargo limitation depends upon the density of the cargo. The cargo storing volume of the vessel is fixed. If a cargo of small density is to be conveyed thereby, the resulting cargo weight may be less than the permitted dead weight for the vessel.

The below listed programing (instructions [44] – [61]) is adapted to compute a vector CDWT(I) where each derived variable CDWT(1)–CDWT(6) separately and independently reflects the maximum cargo dead weight permitted for the vessel for a different possible cargo loading restraint. Instructions (65) – (68) then selects the minimum of these dead weights as the appropriate loading for the ship such that no voyage restriction is violated.

Illustrative programing for determining the dead weight vector CDWT(I) is as follows:

```
CDWT(1) = DWT–(HS–HLL)*TPI*12.0 /
–(BDL*BVHL)/SL⅝⅔WSR                              (44)
CDWT(2) = DWT–(HS–HLD)*TPI*12.01 / –([BVL
–SL]*BVHL)/SL–WSR                                (45)
IF (VCLA), 150, 150, 140                         (46)
140 CDWT(3) = DWT–(CHS–HLCA)*TPI*12.0 /
–(VHL/SL)*(BVL⅝Γ CD)–WSR                         (47)
150 CONTINUE                                     (48)
IF (LZ.EQ.1) GO TO 170                           (49)
IF (LZ.EQ.2) GO TO 172                           (50)
IF (LZ.EQ.3) GO TO 173                           (51)
170 DWTL = DWT                                   (52)
GO TO 180                                        (53)
172 DWTL = WDWT                                  (54)
GO TO 180                                        (55)
173 DWTL = TDWT                                  (56)
180 CDWT(4) = DWTL–BDL*BVHL/SL–WSR               (57)
IF (IFZ1) 195, 195, 190                          (58)
190 CDWT(5) = WDWT–([BDL–SIFZ1]*BVH
L)/SL–WSR                                        (59)
195 CONTINUE                                     (60)
CDWT(6) = CU/SF                                  (61)
```

Instruction (44) examines the necessary information and computes the cargo dead weight restriction CDWT(1) caused by a draft limitation at the loading port. It is observed that there may very possibly be no effective loading port limitation, i.e., the maximum draft at the loading port HLL may exceed, and may possibly greatly exceed the draft HS at full dead weight for the particular ship. In this event, the computed variable CDWT(1) will store a number possibly much larger than the full dead weight of the ship, a physically unrealizable condition. However, when this occurs, CDWT(1) will not be the smallest value for the restriction array CDWT(I), and thus will simply be discarded and not selected as the operative loading limitation.

With particular regard to the loading port, the variable CDWT(1) is determined by subtracting from the total available cargo dead weight DWT several quantities. First, if the port draft HLL is less than the ship full dead weight draft HS, the quantity HS–HLL is positive and represents the number of feet of draft of a ship for which loading must be surrendered such that the ship may reside in, and pass through the loading port. This footage of unusable draft is then multiplied by the tons per inch gradient factor TPI which converts the lost draft into lost cargo tonnage, this factor then being multiplied by twelve to convert from inches to feet. This factor represents a first subtraction from the total available dead weight DWT by reason of loading port draft limitations.

As a second subtraction from DWT, the ship must accommodate fuel which will be consumed on the voyage and, possibly also, the voyage continuation to a refueling station. As computed above, for the actual voyage days, the ship will consume a tonnage of bunkers given by the contents of the storage location BVHL. However, fuel may not be available at the discharge port. Accordingly, fuel must be provided such that the ship can continue its travel the full distance BDL (from the voyage record) between the loading port and a refueling location. Accordingly, the fuel tonnage BVHL, possibly increased by the ratio BDL/SL if BDL exceeds SL, must be subtracted from the dead weight. Similarly, the tonnage WSR for ship stores, potable water, fuel reserves and the like must be subtracted from the available dead weight. Accordingly, by the above-described computation, the variable CDWT(1) will reflect any loading port draft limitations.

In a similar manner, statement (45) provides a similar test to assure that the draft of a ship does not exceed any limitations imposed by the draft of the discharge port (HLD). For the calculation of instruction (45) however, it will be appreciated that the vessel will be lighter vis-a-vis the loading port computation by reason of the fuel consumed in transit. Accordingly, this adjustment is executed in instruction (45) by the modification to the third factor on the right side of the statement expression.

Similarly also, if the voyage dictates that the ship pass through a canal, the test of instruction (46) transfers program control to statement 140. Any limitation imposed on the cargo by reason of the draft HLCA of the canal is computed in instruction (47) to determine the value for CDWT(3). Here again, the fuel consumed from the loading port to the canal is computed to lighten a ship in the computation of instruction (47).

Instructions (49) – (57) determine a maximum cargo dead weight CDWT(4) imposed by reason of the freeboard zone at the loading port. In particular, the IF statements (49) – (51) select an appropriate instruction (170), (172) or (173) depending upon the loading port freeboard zone LZ, and set a variable DWTL equal to the summer (DWT), winter (WDWT) or tropical (TDWT) dead weight. An instruction labeled 180 then computes the restriction due to the freeboard zone at the loading port as given by the appropriate dead weight DWTL, less the weight required for fuel to be consumed, less the capacity required for provisions, stores and reserves WSR.

Instructions (58) – (60) are employed to compute a restriction CDWT(5), if any, required by reason of the first entry vessel from a summer freeboard zone to a winter free-board zone. If such a passage is encountered on the voyage, as determined by the test of instruction (58) operating on a voyage record parameter IFZ1, the limitation CDWT(5) is computed as the allowable dead weight less the fuel required from entry into the winter zone to the refueling station, less stores, provisions and the like.

Finally, CDWT(6) is the dead weight restriction, if any, required for an unusually light load. This cargo weight limitation is determined by computing the weight of the subject cargo, having a density SF, which will fit in the ship's available volume CU.

Having computed all the restrictions, the following instructions (62) – (68) then set the contents of a storage cell CDWT equal to the minimum value of the vector CDWT(I) which will then comprise the actual loading for the vessel.

CDWT=CDWT(1) (62)
LRES=1 (63)
DO 200 I=2,6 (64)
IF (CDWT–CDWT[I]), 200, 200, 198 (65)
198 CDWT=CDWT(I) (66)
LRES=I (67)
200 CONTINUE (68)

Further, after exiting from the above DO loop, a variable LRES will store the identity of the factor giving rise to the loading restriction.

Instructions (62) and (63) initialize the variables CDWT and LRES to some predetermined values, e.g., to values obtaining at the loading port.

Instructions (64) – (68) are of the general form

*DO* 100 *I=M,N,P*

100 CONTINUE and dictate that all statements between the DO statement and the loop-ending statement labeled 100 be executed a number of times wherein the variable I starts out at a value M and proceeds toward a value N on each successive pass with an increment P, P being taken as one if omitted. Thus, the DO loop of statement (64) – (68) test the provisional restriction in CDWT against each restriction value for the factors CDWT(I) in instruction (65). If the argument of the IF statement is positive during any loop traversal, indicating that the restriction CDWT(I) being considered on the I–1's pass through the DO loop is less than the previous value therefor in CDWT, instruction control is transferred to the statement labeled 198. CDWT and LRES are then updated to reflect the new interimly prevailing cargo limitation. Accordingly, for the instant application, the DO loop will be executed five times for I equal 2–6. When the program control exits from the DO loop, CDWT will contain the lowest cargo weight of any of the weight restrictions CDWT(I), and LRES will contain the value of I which corresponds to the operative cargo weight restriction.

Instruction (69):

PRINT, "CARGO CARRIED=", CDWT (69)
IF (LRES–2), 201, 202, 203 (70)
201 PRINT, "CARGO RESTRICTION IS LOADING / PORT DRAFT" (71)
202 PRINT, "CARGO RESTRICTION IS DISCHARGE / PORT DRAFT" (72)
203 PRINT, "CARGO RESTRICTION IS CANAL DRAFT" (73)

is employed to print out the value of the cargo load to be carried by the vessel, and instructions (70) – (73) are shown as an illustrative mode for employing the value of LRES to identify the cargo limitation. Only the outputs for the restrictions for I between 1 and 3 are shown; the remaining limitation identities may be coded for outputting in a similar manner. Alternatively, a full array of six restriction identity output statements may be employed along with six conditional GO TO instructions to cause an appropriate print out.

The program next asks the console attendant for the prevailing market freight rate for the particular cargo (instruction [74])

PRINT, "FREIGHT RATE =" (74)

INPUT, FR (75)

and the keyboard entry is stored in a location FR.

The computing arrangement now contains all requisite information for computing all desired voyage analysis data, as in the following manner:

$$GF = FR*CDWT \quad (76)$$

$$S = GF - CT \quad (77)$$

$$ST = ST + S \quad (78)$$

$$SPD = S/DT \quad (79)$$

$$TSPD = ST/DTT \quad (80)$$

$$CR = SPD*30.4/DWT \quad (81)$$

$$CRT = TSPD*30.4/DWT \quad (82)$$

The gross freight revenues GF are computed by multiplying the freight rate FR by the loaded cargo CDWT, and the operating surplus S for the voyage is determined by taking the difference between revenues GF and costs (instruction [77]). The surplus may be accumulated over a sequence of voyages as in instruction (78). The surplus on a daily basis for a voyage SPD, and over a series of voyages TSPD, are next determined (instructions [79]–[80]).

To render the computed data more meaningful, and to facilitate data analysis and comparison, the surplus for the voyage S and for the series of voyages ST are normalized to equivalent monthly time charter rates CR and CRT, respectively. The charter rates are determined by dividing the daily surplus by the dead weight of the vessel, and multiplying by an average of 30.4 days in a month.

Instructions (83) – (86):

PRINT, "GROSS FREIGHT =," *GF* (83)
PRINT, "OPERATING SURPLUS =," *S* (84)
PRINT, "OPERATING SURPLUS/DAY =," *SPD* (85)
PRINT, "EQUIVALENT CHARTER RATE =," *CR* (86)

then print out all the computational results for the last considered voyage.

Instruction (87):

PRINT, "MORE VOYATES?" (87)
INPUT, MORE (88)
IF (MORE. E.Q. "YES") *GO TO* 20 (89)
PRINT, "TOTAL DAYS =," *DTT* (90)
PRINT, "TOTAL SURPLUS =," *ST* (91)
PRINT, "TOTAL SURPLUS/DAY =," *TSPD* (92)
PRINT, "OVERALL CHARTER RATE =," *CRT* (93)

causes the teletypewriter to ask the attendant whether he wishes to computationally put the ship through a further voyage to develop or continue a voyage sequence for testing, thereby considering ship performance over an extended period. If an additional voyage is desired, the attendant enters the alphanumeric message YES into the storage location M0RE via the teletype unit and, if no further voyages are desired, any other entry, such as N0 is made.

Instruction (89) tests to see if the alphanumeric characters YES are stored in MORE and, if so, i.e., if an additional voyage is to be examined, program control is passed back to the instruction labeled 20 (instruction [5]) to reinitiate the entire data processing sequence for the next contemplated voyage. If not, the conditional transfer of the statement (89) is not satisfied and the PRINT statements of instructions (90)–(93) print out the performance data accumulated over all voyages considered for the ship.

The above described program has thus computed all desired financial information characterizing the performance of a particular ship on a specific trade and, if desired, the overall performance of the ship on an arbitrarily long sequence of voyages. Moreover, it is observed that the information generated at the operator's input/output device during program execution is precisely that required to provide a meaningful record for marine operating personnel. The teletype record is not cluttered with program jargon more properly belonging in the computer programer's domain. In particular the record provided the user includes the name of the ship, identification of the voyage legs, any parameter modifications, the economic performance of a ship on each voyage, and the computed economic performance of the ship over a sequence of voyages. Moreover, any additional desired information such as days at sea, cost itemization or the like may be derived by simply inserting additional PRINT statements in the coding.

The above described basic voyage data analysis mode of computing ship's performance is *per se* a useful tool for permitting an owner to usefully apply his ships to the available trades, and to fulfill any contractual obligations.

As a further aid in marine administration, as for scheduling, and in accordance with a further aspect of my invention, a teletypewriter or input/output presentation is automatically generated in matrix form to characterize the performance of each of *n* ships on each of *m* voyages, where *n* and *m* are independent positive integers. In this regard, the identity of the ships and voyages, together with all other information required as input information by the above program, is stored in the computing apparatus, as in an additional file in the peripheral store, a further part of the computer main frame memory, or the like. The above voyage analysis program is then automatically executed $n \times m$ times to apply each ship to each voyage, as by instructions (94) – (97).

*DO* 500 *J* = 1,*N* (94)

*DO* 400 *K* = 1,*M* (95)

400 CONTINUE (96)
500 CONTINUE (97)

where the voyage analysis program is employed as the operative DO loop processing between statements (95) and (96). The matrix data outputting may be effected by appropriate matrix FORMAT and/or PRINT statements following instruction (97). To facilitate such computation, all derived variables may be doubly subscripted to identify a ship and voyage.

The matrix so formed, with economic data normalized to a common base, viz., the equivalent time charter rate, is a valuable operational aid, as for facilitating ship scheduling and contract performance.

The above described arrangement is merely illustrative of the principles of the present invention. Numerous modifications and adaptations thereof will be readily apparent to those skilled in the art without departing from the spirit and scope of the present invention.

What is claimed is:

1. A method for automatically effecting voyage analysis by means of a general purpose digital computer, comprising directing said computer through a stored program to perform the following steps, storing plural ship records, each including like-ordered ship parameters, in a ship file, storing plural voyage records, each including like-ordered voyage parameters in a voyage file, operatively selecting one of said ship records, operatively selecting one of said voyage records, and determining the cargo loading available to the ship represented by said selected ship record when engaged in the voyage represented by said selected voyage record responsive to said ship and voyage records selected from said storing means therefor.

2. A method as in claim 1 wherein said loading determining step comprises computing the available cargo loading capacity subject to differing restrictions, and selecting the minimum computed loading.

3. A method as in claim 2 wherein said loading computing step includes the step of computing cargo capacity subject to draft restraints.

4. A method as in claim 2 wherein said loading computing includes the step of computing cargo capacity subject to physical ship constraints.

5. A method as in claim 2 wherein said loading computing includes the step of computing cargo capacity subject to freeboard zone restrictions.

6. A method as in claim 2 further comprising calculating voyage costs, computing voyage revenues, and computing surplus measured by the difference between said revenues and costs.

7. A method as in claim 6 further comprising normalizing said surplus to an equivalent time charter rate.

8. A method as in claim 1 further comprising modifying selected stored entries of said selected ship record and said selected voyage record.

9. A method as in claim 1 further comprising automatically and sequentially effecting voyage analysis for plural stored ship records in conjunction with a plurality of stored voyage records, and generating an output data presentation in coordinate matrix form.

10. Apparatus for effecting voyage analysis computation comprising a general purpose digital computer having a stored program which enables said computer to perform the following steps, storing plural ship records, each including like-ordered ship parameters, in a ship file, storing plural voyage records, each including like-ordered voyage parameters in a voyage file, operatively selecting one of said ship records, operatively selecting one of said voyage records, and determining the cargo loading available to the ship represented by said selected ship record when engaged in the voyage represented by said selected voyage record responsive to said ship and voyage records selected from said storing means therefor.

11. Apparatus as in claim 10 wherein said loading determining step comprises computing the available cargo loading capacity subject to differing restrictions, and selecting the minimum computed loading.

12. Apparatus as in claim 11, wherein said loading computing step includes the step of computing cargo capacity subject to draft restraints.

13. Apparatus as in claim 11 wherein said loading computing includes the step of computing cargo capacity subject to physical ship constraints.

14. Apparatus as in claim 11 wherein said loading computing includes the step of computing cargo capacity subject to freeboard zone restrictions.

15. Apparatus as in claim 11 further comprising calculating voyage costs, computing voyage revenues, and computing surplus measured by the difference between said revenues and costs.

16. Apparatus as in claim 15 further comprising normalizing said surplus to an equivalent time charter rate.

17. Apparatus as in claim 10 further comprising modifying selected stored entries of said selected ship record and said selected voyage record.

18. Apparatus as in claim 17 further comprising automatically and sequentially effecting voyage analysis for plural stored ship records in conjunction with a plurality of stored voyage records, and generating an output data presentation in coordinate matrix form.

* * * * *